United States Patent [19]

Maekawa

[11] Patent Number: 5,131,740
[45] Date of Patent: Jul. 21, 1992

[54] DISTANCE MEASURING APPARATUS

[75] Inventor: Hiroko Maekawa, Himeji, Japan

[73] Assignee: Mitsubishi Denki Kabushiki Kaisha, Tokyo, Japan

[21] Appl. No.: 798,954

[22] Filed: Nov. 27, 1991

[30] Foreign Application Priority Data

Nov. 29, 1990 [JP] Japan .................. 2-336136

[51] Int. Cl.⁵ .............................. G01C 3/00
[52] U.S. Cl. ....................................... 356/1
[58] Field of Search ................ 356/1, 4; 354/402–409

[56] References Cited

U.S. PATENT DOCUMENTS 4,178,098 12/1979 Asano et al. .......................... 356/1
4,589,770 5/1986 Jones et al. ........................... 356/1
4,814,810 3/1989 Ishiguro ............................ 356/1 X Primary Examiner—Mark Hellner
Attorney, Agent, or Firm—Sughrue, Mion, Zinn, Macpeak and Seas

[57] ABSTRACT

A distance measuring apparatus includes a pair of first and second image sensors, and a pair of first and second memories for successively storing a pair of first and second image signals output from the first and second image sensors. A CPU sets a window for the first image signal and compares a reference image signal within the window with the second image signal while shifting these signals relative to each other to thereby arithmetically measure a distance to the object. A window memory stores the reference image signal within the window. The CPU further compares the reference image signal within the window memory with first image signals stored in the first memory after a predetermined time, so as to find the most similar first image signal and set a provisional window enclosing it. Displacing the provisional window around it initially set position, the position of the window is updated only when the image signal within the provisional window as displaced exhibits a horizontal symmetry. Thus, the process and hence time for distance measurement can significantly be simplified and reduced while ensuring high accuracy and reliability.

1 Claim, 4 Drawing Sheets ured swiftly.

DISTANCE MEASURING APPARATUS

BACKGROUND OF THE INVENTION

The present invention relates to a distance measuring or range-finding apparatus. More particularly, the invention is concerned with a distance measuring apparatus which is adapted to continuously or successively measure a distance to an object such as a motor vehicle or the like.

Distance measuring apparatuses using image sensors are well known, for example, as disclosed in Japanese Patent Publication No. 63-46363. An illustrative structure of this known apparatus is shown in FIG. 5.

Referring to the FIGURE, the apparatus includes a pair of lenses 1, 2 representing right and left optical systems disposed with a horizontal distance therebetween which corresponds to a base length B. Disposed respectively at the rear sides of the lenses 1 and 2 are two-dimensional image sensors 3 and 4 each with a distance corresponding to the focal length of the associated lens. An object 5 is located in front of the lenses 1 and 2 at a distance R from a line or plane passing through the centers of the lenses 1, 2. A pair of analogue-to-digital (A/D) converters convert analogue signals input from the image sensors 3 and 4 to digital signals. A pair of memories 8, 9 store the digital signals or data input from the A/D converters 6 and 7, respectively. A central processing unit or CPU 10 processes the image data stored in the memories 8 and 9 to thereby determine the distance to the object 5.

In operation, the image of the object 5 is focused onto the image sensors 3 and 4 through the lenses 1 and 2, respectively. Image or picture signals resulting from photoelectric conversion of the light images sensed by the image sensors 3 and 4 are converted to digital signals or data through the respective A/D converters 6 and 7 to be subsequently stored in the memories 8 and 9. The CPU 10 processes the image data stored in the memories 8 and 9 for arithmetically determining the distance to the object 5.

The image data processing executed by the CPU 10 will be described below in some details. At a first step, the CPU 10 reads out from the memories 8 and 9 the image data in the form of picture elements or pixels located at the addresses corresponding to the leftmost top positions in the images as sensed by the image sensors 3 and 4, respectively, and arithmetically determine an absolute difference between these image data. Next, the CPU 10 reads out from the memories 8 and 9 the image data corresponding to the second or next leftmost top pixels (i.e., the pixels moved one pixel to the right from the leftmost top pixels), respectively, to arithmetically determine an absolute difference between these image data. Similar processing is performed sequentially by shifting the image data one pixel by one pixel for all the pixels located in the effective image areas of the memories 8 and 9. By summing the absolute differences thus determined, a first integrated value is determined.

Subsequently, the CPU 10 reads out from the memories 8 and 9 the image data of the pixel located at the leftmost top position in the image sensed by the image sensor 3 and that of the pixel located at the second or next leftmost top position in the image sensed by the image sensor 4, respectively, to thereby arithmetically determine an absolute value of the difference between these image data. Similar processings are successively performed by shifting the image data to the right one pixel by one pixel for all the pixels as sensed by the image sensors 3 and 4. The absolute differences thus determined are then summed up to provide a second integrated value.

In this manner, the CPU 10 arithmetically calculates the absolute values of differences between the pixel signals of the image sensor 4 and those of the image sensor 3 which are obtained for the pixels sequentially displaced or shifted one pixel by one pixel from those of the image sensor 4. Finally, the CPU 10 determines a minimum one of the integrated or summed values thus calculated. In that case, when the minimum value originates in the pixels of the image sensors 3 and 4 which are displaced from each other by a distance corresponding to a number n of the pixels, this means that the right and left images picked up by the sensors 3 and 4 are shifted or deviated by a distance corresponding to n pixels relative to the optical axis of the lens 1 or 2. In other words, by representing by p the pitch of the pixels in the image sensors 3, 4, the magnitude of the deviation or distance between the right and left images is given by (n×p), whereby the distance R to the object 5 can be determined by the triangulation method as follows:

$$R = (f \times B)/(n \times p) \qquad (1)$$

where B represents the base length between the centers of the lenses 1, 2; and f represents the focal length of the lenses 1, 2.

With the arrangement of the conventional distance measuring or range-finding apparatus as described above, an enormous amount of time is taken for arithmetically determining the distance to the object because comparisons of the image data (pixel signals) as mentioned above are performed for all the pixels of the entire image sensed by the image sensors 3 and 4. As a consequence, with the conventional distance measuring apparatus described above, it is very difficult or almost impossible in practice to apply or utilize the apparatus for an inter-vehicle distance alarm system, an automatic vehicle-following system or the like, in which the distance to a moving object such as a preceding vehicle has to be continuously or successively measured swiftly.

SUMMARY OF THE INVENTION

In the light of the state of the art described above, it is an object of the present invention to provide a novel and improved distance measuring apparatus which is able to process image data quite swiftly while ensuring high reliability in the distance measurement, and which can thus find applications in an inter-vehicle distance measuring system, an automatic vehicle-following system and the like.

In view of the above and other objects which will become more apparent as description proceeds, the present invention provides a distance measuring apparatus comprising a pair of first and second image sensors; a pair of optical systems for focusing an image of an object on the image sensors, respectively; a pair of first and second memories for storing a pair of first and second image signals output from the first and second image sensors; window setting means for setting a window for the first image signal from the first image sensor; arithmetic means for performing comparison between a reference image signal located within the window and the second image signal from the second image sensor while shifting these image signals relative to each other to thereby arithmetically determine a distance to the object; a window memory for storing the reference image signal within the window; provisional window setting means for comparing the reference image signal within the window memory with first image signals stored in the first memory after a predetermined time has elapsed from the time when the reference image signal is stored in the window memory, so as to determine an image signal in the first memory which is most similar to the reference image, the provisional window setting means being operable to set a provisional window enclosing the most similar image signal; and window updating means for displacing the provisional window around the initially set position thereof to determine a position thereof in which the image signal within the provisional window is horizontally symmetric with respect to a vertical center line of the provisional window, the window updating means being operable to update the position of the window to be the position of the provisional window thus determined only when the image within the provisional window has a horizontal symmetry.

The above and other objects, features and advantages of the present invention will be better understood from the following detailed description of preferred or exemplary embodiments of the invention taken in conjunction with the accompanying drawings.

DESCRIPTION OF THE PREFERRED EMBODIMENTS

The present invention will now be described in detail in conjunction with exemplary or preferred embodiments thereof by reference to the drawings.

Figure 1:
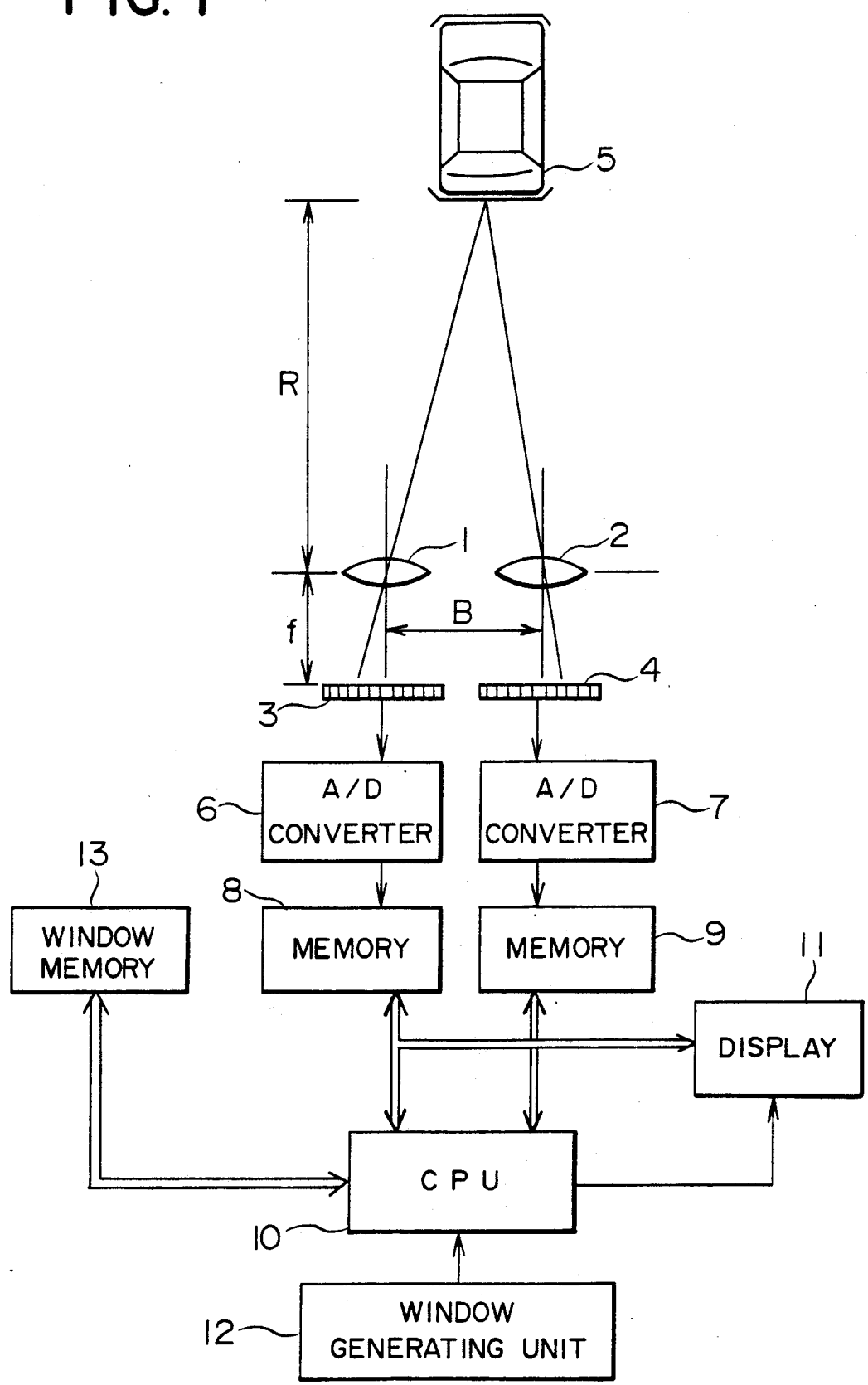
FIG. 1 is a block diagram showing the general arrangement of a distance measuring apparatus according to an embodiment of the present invention.
Figure 5:
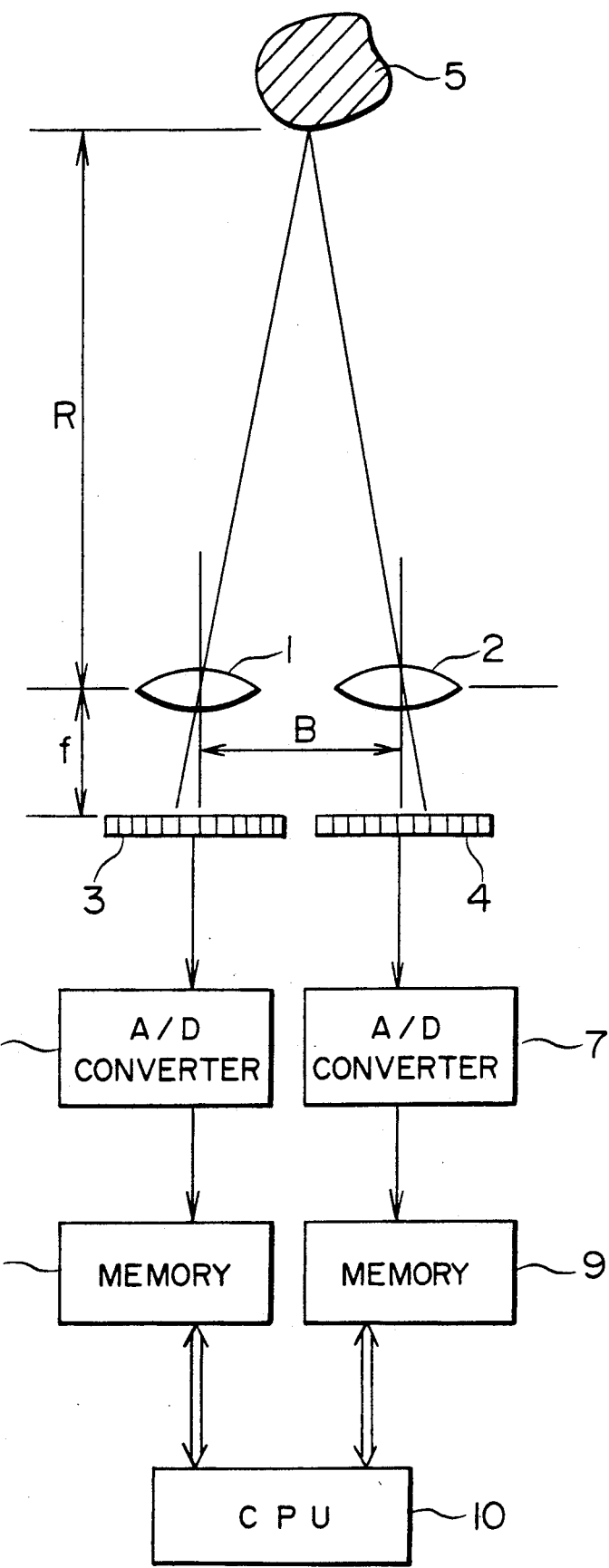
FIG. 5 is a view showing the structure of a conventional distance measuring apparatus.

FIG. 1 is a block diagram showing the structure of the distance measuring apparatus according to an embodiment of the present invention. In this figure, equivalent or like parts as those shown in FIG. 5 are denoted by like reference symbols and repeated description thereof is omitted.

Referring to FIG. 1, a display unit 11 serves to display an image of an object 5 on a screen thereof picked up by the image sensor 3 as a first or left-hand image on the basis of image data stored in a memory 8 under the control of a central processing unit or CPU 10. A window generating unit 12 is adapted to be operated by an operator or driver to generate a window for the left-hand image reproduced from the image data stored in the memory 8 while the driver is watching a picture or image on the screen of the display unit 11. The window generating unit 12 is operatively connected to the CPU 10. Finally, a window memory 13 stores the image signal within the window as a reference picture signal or image data. The window memory 13 is also operatively connected to the CPU 10.

The CPU 10 cooperates with the display unit 11 and the widow generating unit 12 to function as a window setting means for setting a window on the display screen for image signals which are stored in the memory 8 at a given time point, as an arithmetic means for arithmetically determining the distance to an object 5 in accordance with a triangulation method through comparison of the image data stored in the memory 9 with those located within the window while shifting the image data or signals supplied from the memory 9 relative to the reference image data within the window, as a provisional window setting means for setting a provisional window by comparatively processing the reference image data stored in the window memory 13 and image signals stored in the memory 8 after the lapse of a predetermined time, and as a window updating means for shifting or displacing the provisional window circumferentially or around its initially set position to thereby updating the window only when the picture or image within the provisional window exhibits a horizontal symmetry (i.e., symmetry with respect to the vertical center line of the provisional window).

Figure 2A:
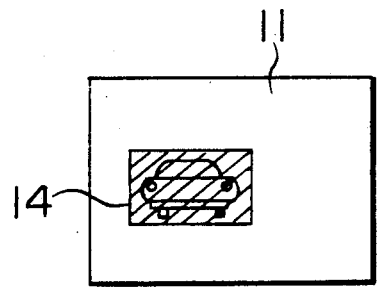
FIGS. 2A and 2B are views for illustrating an area for which comparison of image data is performed on the basis of a reference picture signal within a window.
Figure 2B:
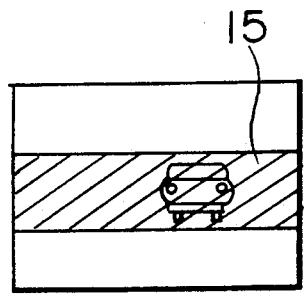

Operation of the distance detecting apparatus will now be described. A pair of lenses 1 and 2, which are disposed in a horizontally spaced relation with respect to each other and constitute a pair of right-hand and left-hand optical systems, respectively, focus an image of the object 5 onto the image sensors 3 and 4 which are disposed in optical alignment with the lenses 1 and 2, respectively. The output signals of the image sensors 3 and 4 are converted into digital signals through the analogue-to-digital converters 6 and 7, respectively, by sampling at a predetermined sampling interval or frequency. The digital signals or image data thus obtained are stored in the memories 8 and 9, respectively, at addresses designated by the CPU 10. The left-hand image data stored in the memory 8 are also transferred to the display unit 11 and displayed on the screen thereof as a picture (shown in FIG. 2A) of the object 5, which is in the form of a moving car in the illustrated embodiment, under the control of the CPU 10. At this juncture, it should be noted that the operator or driver of a motor vehicle on which the distance measuring apparatus of the invention is installed can designate the position and size of a window so as to enclose therein the image of the object 5 with a minimum margin by manipulating the window generating unit 12 while watching the picture displayed on the screen of the display unit 11. The CPU 10 fetches the window data as designated, to thereby set the window on the image data stored in the memory 8, as a result of which a window 14 enclosing the picture of the object 5 can be displayed on the screen of the display unit 11, as shown in FIG. 2A. Further, the CPU 10 sets a horizontally extending comparison area 15 containing the same area as that of the window 14 and having the same vertical length as that of the widow 14 on the right-hand image data stored in the memory 9, as is pictorially illustrated in FIG. 2B. Thereafter, with reference to the image or picture (termed the reference image or picture) within the window 14 (shown in FIG. 2A), the CPU 10 successively shifts a region in the comparison area 15, which region has the same size as the reference image, from the left side in the rowwise or horizontal direction on a one-by-one pixel basis, i.e., on a column-by-column basis, and compares the comparison image with the reference image. On the basis of the result of this comparison, the CPU 10 arithmetically determines the distance to the object 5 in accordance with the previously mentioned equation (1).

More specifically, on the basis of the image signals $L_{i,j}$, where i, j designate the pixel coordinates at the cross point between the i-th row and the j-th column of the image data stored in the memory 8 and corresponding to the reference image within the window 14 (the same definition being also applied to the image signals or image data of the right-hand image) and the image signals $R_{i,(j+l)}$ stored in the memory 9 and belonging to the comparison image within the comparison area 15, where l indicates magnitude of the pixel-equivalent shift (the amount of shift equivalent to the number of pixels shifted) in the rowwise or horizontal direction of the comparison image relative to the reference image). The CPU 10 arithmetically determines a total sum of absolute values of differences between the image signals from the memory 9 and the reference signals, respectively, which is given by the following equation:

$$C_l = \sum_i \sum_j |L_{i,j} - R_{i,(j+l)}|$$

Subsequently, the CPU 10 determines a minimum value Cm at which the reference image and the comparison image provide the best match or coincide with each other with a minimum error or difference.

If $0 \leq m < 2$, the displacement n appearing in the previously mentioned equation (1) is made equal to m. On the other hand, if $m \geq 2$, $C_{m-1}$ and $C_{m+l}$ are calculated, and n is made equal to m' which is calculated by a three-point interpolation using $C_{m-l}$ and $C_{m+1}$. The CPU 10 can now determine the distance R to the object 5 (e.g., the distance to the preceding vehicle) in accordance with the equation (1) mentioned hereinbefore on the basis of the pixel pitch p of the image sensor 3, 4, the base length B of the optical systems, the focal length f of the lenses 1, 2 and the displacement n between the reference image and the comparison image.

Parenthetically, the three-point interpolating method mentioned above is a well-known procedure for improving the resolution and accuracy in the distance measurement which are degraded to some extent due to a pattern shift and can be defined by the following equations (2) and (3):

When $C_{m-1} \geq C_{m+l}$, $$m' = (C_{m-l} - C_{m+1})/\{2 \times (C_{m-l} - C_m)\} \quad (2)$$

When $C_{m-l} < C_{m+l}$, $$m' = (C_{m+1} - C_{m-1})/\{2 \times (C_{m+l} - C_m)\} \quad (3)$$

For particulars of the three-point interpolation, reference may be made to, for example, "AIM Minolta Technology Report", a special edition in 1986, pp. 38-39, published by Minolta Company of Japan.

After the distance measurement through the procedure described above, the CPU 10 executes an updating operation or function for automatically moving the window 14 to follow the movement of the object 5, so that the distance to the object 5 can be continuously or successively measured. In this way, once the window 14 is set by the operator or driver, the distance to the object 5 can be continuously measured in an automatic fashion even when the object 5 is moving, so long as the object 5 is located within the field of view of the optical systems.

Figure 3A:
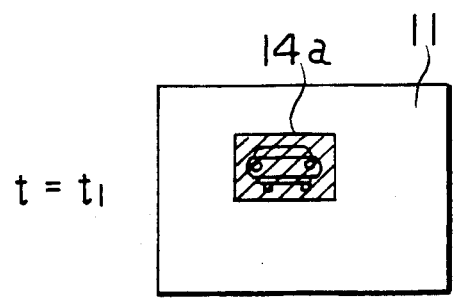
FIGS. 3A, 3B and 3C are views for illustrating a procedure for updating a window.
Figure 3B:
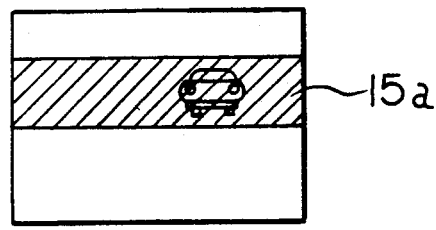
Figure 3C:
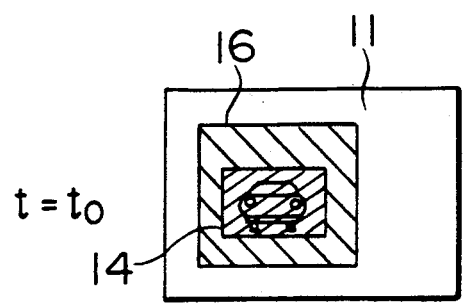

FIGS. 3A to 3C are views for illustrating the window updating function or procedure. Let us assume that the CPU 10 determines the distance R to the object 5 through the procedure described above at a time point $t_0$ ($t = t_0$). In succession to the determination of the distance R, the image data $L_{i,j}$ stored in the memory 8 and corresponding to the reference image enclosed by the window 14 at the time point $t_0$ is loaded in the window memory 13 as the reference picture or image data $W_{i,j}$. Subsequently, at a time point $t_1$ ($t_0 + \delta t$) where $\delta t$ represents a sampling period, an image signal $L'_{(i+q),(j+l)}$ of the image data sampled and stored in the memory 8 at the above-mentioned time point $t_1$, which image signal corresponds to that within the window 14, is compared with the image signal $W_{i,j}$ stored within the window memory 13 by sequentially shifting the former $L'_{(i+q),(j+l)}$ within a circumscribing area 16 encompassing the window 14, as is illustrated in FIG. 3C, through the procedure described hereinbefore. In this case, the comparison picture or image $L'_{(i+q),(j+l)}$ is shifted on the pixel-by-pixel basis not only in the rowwise or horizontal direction but also in the columnwise or vertical direction.

In this conjunction, it is assumed that the image signal $L'_{(i+q),(j+l)}$ and the comparison image are deviated by l pixels and q pixels relative to the position of the reference image within the initially set window 14 in the rowwise and columnwise directions, respectively.

In the course of the image comparison process described above, the CPU 10 successively determines the total sums of absolute values of differences between both the picture signals, that is:

$$\sum_i \sum_j |W_{i,j} - L'_{(i+q),(j+l)}|$$

whereon an area corresponding to the amount of shift or the number of shifted pixels (q=qo, l=lo), for which the total sum assumes a minimum value, is set as a provisional window 14a at the time point $t_l$ (see FIG. 3A). FIG. 3B shows a comparison area 15a of the right-hand image data stored in the memory 9 on the assumption that the above-mentioned provisional window 14a is set as an updated window for the left-hand image stored in the memory 8.

Figures 4A, 4B:
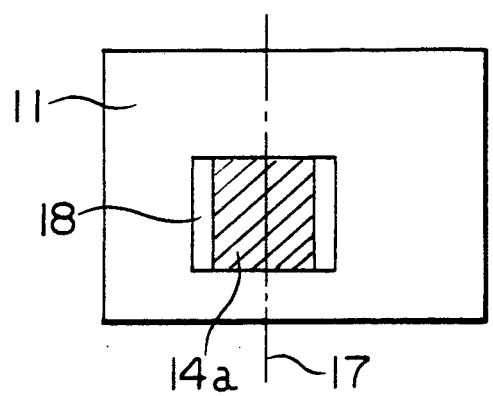
FIGS. 4A and 4B are views for illustrating a window defining procedure.

FIGS. 4A and 4B are views for illustrating a window defining procedure for checking a horizontal symmetry (symmetry with respect to a vertical center axis) of the image signal $L'_{(i+qo),(j+lo)}$ within the provisional window 14a determined through the procedure described above. The image signal $L'_{(i+qo),(j+lo)}$ within the provisional window 14a is divided into segments $a_{I,J}$, where $I=1, \ldots, \alpha$ and $J=1, \ldots, \delta$), as shown in FIG. 4A, and a vertical center line or axis indicated by a single-dot dash line 17 is established for the provisional window 14a. With reference to this vertical center axis 17, the CPU 10 determines a center axis for each column, which is given by the following equation:

$$E_I = \sum_{j=1}^{\frac{\beta}{2}} a_{I,J} - a_{I,(\beta-J+l)}$$

whereon the total sum for all the columns of the provisional window 14a is determined as follows:

$$S_0 = \sum_{J=1}^{\alpha} E_J$$

The provisional window 14a is shifted to the left or to the right on the pixel-by-pixel basis, and upon every shift, a value S indicating the symmetry is determined through the procedure described above. The area within which the provisional window 14a is moved to the left or right is a circumscribing area 18 which extends to the left and to the right of the provisional window 14a and deviated therefrom by plural pixels, as shown in FIG. 4B. The provisional window 14a is moved by x pixels to the left and right, respectively, and the results of the arithmetic operation executed through the similar procedure described above are represented by $S_{-x}$ and $S_x$, respectively. When $S_u$ is found which assumes a value smaller than a predetermined value in an area corresponding to the number of shift u at which the results of the arithmetic operation become smallest, it is then decided that the image within the window has the vertical symmetry, and the window is set as an updated window, which is then displayed on the screen of the display unit 11. By way of example, when $S_0$ is a minimum value smaller than the predetermined value, the provisional window 14a is displayed as the updated window on the screen of the display unit 11, as illustrated in FIG. 3A, whereon the CPU 10 sets a corresponding comparison area 15a for the right-hand image, as shown in FIG. 3B.

Once the window has been updated in this manner, the CPU 10 compares the right-hand image within the comparison area with the image which is now present within the updated window and which serves as the reference image, through the same procedure as described hereinbefore with reference to FIG. 2, to thereby arithmetically determine the distance to the object 5 in accordance with the equation (1) or the equations (1) to (3), whereon the image signals within the updated window are loaded in the window memory 13 as the updated reference image data.

When the value $S_u$ indicative of the vertical symmetry exceeds the predetermined value, the CPU 10 decides that an error has occurred, and disables the automatic window updating function for improved reliability in the distance measurement.

As will now be appreciated from the foregoing, according to the teachings of the present invention incarnated in the illustrated embodiment, it is possible to reduce the number of the pixels involved in the image comparison owing to the use of the image signals within the window having a much smaller area than the entire image data area in the memory, whereby the time required for the image comparison can be remarkably shortened. Further, due to the window updating function, the window initially set by the operator or driver so as to enclose therein the object such as a motor vehicle running ahead is automatically updated with respect to the position of the window by following the movement of the object while checking the horizontal symmetry of the image within the window, so long as the object remains lying within the field of view of the optical systems. As a result, information on the distance to the object, e.g., the inter-vehicle distance, can automatically be made available in a continuous or successive manner once the window has been set.

In the case of the illustrated embodiment, the window is generated for the left-hand image, it goes, however, without saying that the window may equally be formed for the right-hand image.

Besides, although it has been described that a pair of right and left lenses 1 and 2 are provided, the invention is not restricted to such a horizontal arrangement of the lenses. These paired lenses may be disposed vertically or obliquely with the respective image sensors being correspondingly disposed with substantially the same effects.

It should further be mentioned that although the three-point interpolation method defined by the equations (2) and (3) is adopted in the arithmetic distance determination in the case of the illustrated embodiment, other interpolation methods may be resorted to so far as interpolation can be realized with good accuracy.

Besides, the window defining procedure as well as the arithmetic determination of the area circumscribing or covering the provisional window as described with reference to FIG. 4 may be modified or changed so far as the horizontal symmetry of the intra-window image can be determined.

Thus, the distance measuring apparatus according to the present invention is advantageous in that the time required to determine the distance to an object of concern can remarkably reduced while ensuring high reliability in the distance measurement. Thus, the distance measuring apparatus can profitably be applied to the inter-vehicle distance alarm system, an automatic vehicle-following system and the like.

Many features and advantages of the present invention are apparent from the detailed specification and thus it is intended by the appended claims to cover all such features and advantages of the apparatus which fall within the true spirit and scope of the invention. Further, since numerous modifications and changes will readily occur to those skilled in the art, it is not desired to limit the invention to the exact construction and operation illustrated and described. Accordingly, all suitable modifications and equivalents may be resorted to, falling within the scope of the invention.

What is claimed is:

1. A distance measuring apparatus comprising:
   a pair of first and second image sensors;
   a pair of optical systems for focusing an image of an object on said image sensors, respectively;
   a pair of first and second memories for storing a pair of first and second image signals output from said first and second image sensors;
   window setting means for setting a window for said first image signal from said first image sensor;
   arithmetic means for performing comparison between a reference image signal located within said window and said second image signal from said second image sensor while shifting these image signals relative to each other to thereby arithmetically determine a distance to said object;
   a window memory for storing said reference image signal within said window;
   provisional window setting means for comparing said reference image signal within said window memory with first image signals stored in said first memory after a predetermined time has elapsed from the time when said reference image signal is stored in said window memory, so as to determine an image signal in said first memory which is most similar to said reference image, said provisional window setting means being operable to set a provisional window enclosing the most similar image signal; and window updating means for displacing said provisional window around the initially set position thereof to determine a position thereof in which said image signal within said provisional window is horizontally symmetric with respect to a vertical center line of said provisional window, said window updating means being operable to update the position of said window to be the position of said provisional window thus determined only when said image within said provisional window has a horizontal symmetry.

* * * * *